Patented Oct. 17, 1922.

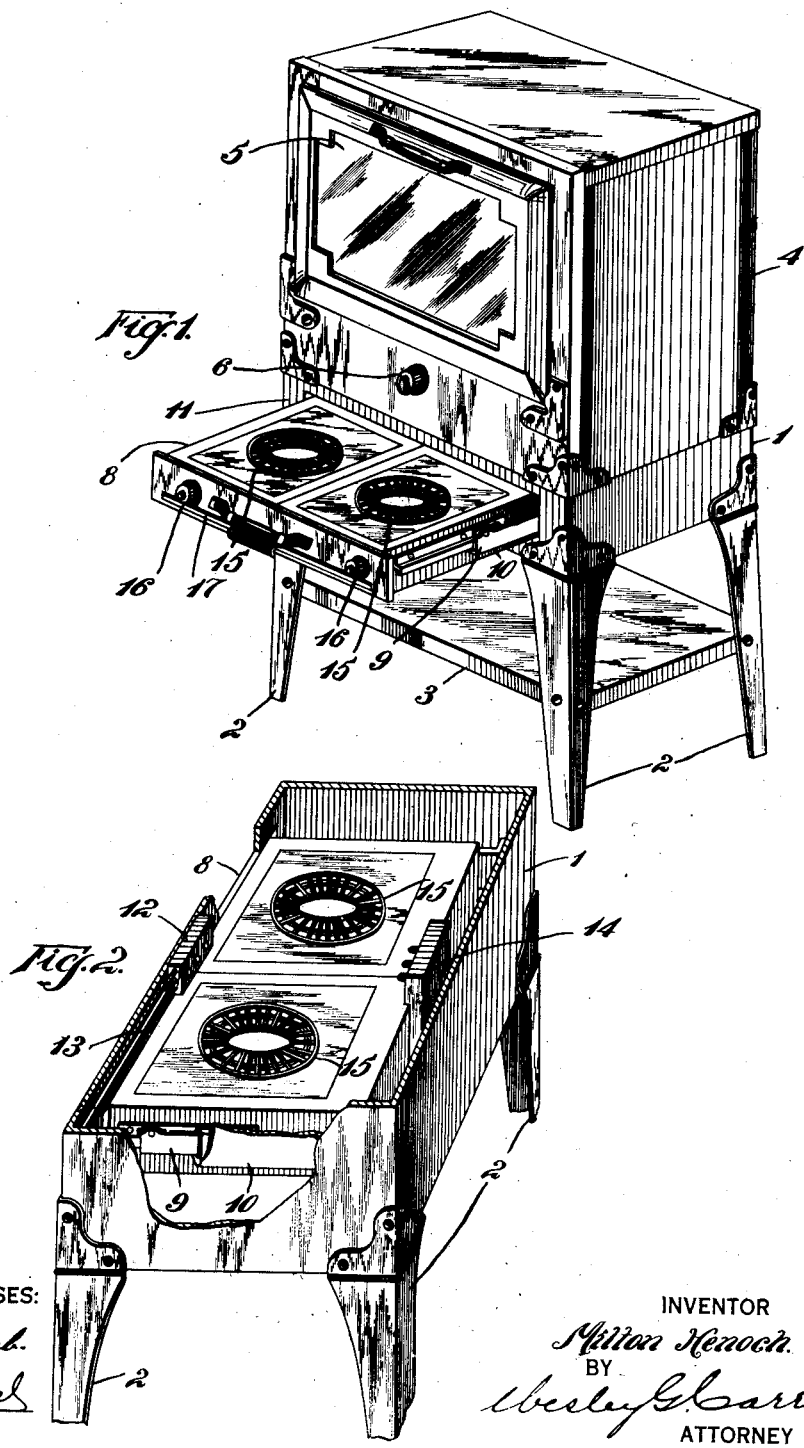

1,431,953

UNITED STATES PATENT OFFICE.

MILTON HENOCH, OF LAPORTE, INDIANA, ASSIGNOR TO WESTINGHOUSE ELECTRIC & MANUFACTURING COMPANY, A CORPORATION OF PENNSYLVANIA.

APARTMENT-HOUSE RANGE.

Application filed January 5, 1921. Serial No. 435,054.

*To all whom it may concern:*

Be it known that I, MILTON HENOCH, a citizen of the United States, and a resident of Laporte, in the county of Laporte and State of Indiana, have invented a new and useful Improvement in Apartment-House Ranges, of which the following is a specification.

My invention relates to electrically heated apparatus and particularly to electric ranges, and it has for its object to provide compact ranges for use in apartment houses.

In the ordinary electric range, the oven and the stove top are placed in side-by-side relation on a supporting frame, resulting in a relatively wide range.

In practising my invention, I provide a supporting frame so arranged as to permit of placing the electric stove therein and suitable means for permitting the stove to be moved forwardly in an aperture in the frame when it is desired to use the same for cooking operations.

When the stove is not in use, it may be pushed back into the supporting frame.

I provide means for limiting the forward movement of the stove and for permitting the energization of the heating element located therein only when the stove is at the forward limit of its path of movement.

In the single sheet of drawings,

Figure 1 is a perspective view of an electric range embodying my invention, and

Fig. 2 is a perspective view of such a range with the electric oven removed to show the details of the electric connections of the stove and with the stove in its inactive position.

A frame 1, substantially of open-box shape and rectangular in outline, is provided with a plurality of suitable supporting members 2. A shelf 3 may be provided to increase the solidity of the frame and supporting structure.

An electrically heated oven 4 is suitably mounted on the top of the frame 1 and is provided with a door 5 and with an electrical heating element (not shown). The heating element may be controlled by means of a suitable switch 6 located in any suitable or desired place but here shown as mounted on the front of the oven 4 immediately below the door 5.

A movable stove top 8 is so mounted upon sliding members 9 and co-operating supporting members 10 as to permit of its being pulled outwardly, while maintaining its substantially horizontal position, through an aperture 11, which is located in the front surface of the frame 1. Any desired construction of the means 9 and 10 may be used, similar to that employed in ordinary filing cases, and no detailed description is, therefore, given of these parts.

A terminal block 12 is mounted on the inside of the front wall of the frame 1, immediately above the aperture 11, and is connected, by means of suitable conductors 13, to a supply circuit (not shown). A contact block 14 is mounted on the stove top 8, at the rear end thereof, and in such position as to engage the terminal block 12 when the stove top is pulled to substantially the forward limit of its path of movement. The contact block 14 is connected, by means of suitable conductors (not shown), to heating elements 15 mounted in the stove top, and the supply of energy thereto is controlled by means of suitable switches 16 which are mounted on the front wall of the stove 8. The contact block 14 is made rugged enough so that it also operates as a stop member when the contacts mounted therein shall have made positive engagement with the co-operating sockets placed in the terminal block 12. A removable drip pan 17 is located in the stove top 8 below the heating elements.

It may be noted that the device embodying my invention provides a relatively narrow electric range in which the electric stove is located immediately below the oven. It may further be noted that the use of the device embodying my invention precludes the energization of the heating elements located in the stove until the stove has been moved forwardly to substantially the limit of its path of movement in that direction.

When the stove is pushed backwards into the supporting frame of box shape, the aperture in the front wall of the frame is closed by the front wall of the stove, which front wall may be so made as to have a neat and ornamental appearance.

Many apartment houses have relatively small rooms which may, in some cases, preclude the use of a range of the ordinary type in which the stove and the oven are placed in side-by-side relation and in which the use of a range embodying the principles shown in this invention would be highly desirable.

Various modifications may be made in the device embodying my invention without departing from the spirit and scope thereof, and I desire that only such limitations shall be placed thereon as are imposed by the prior art or are specifically set forth in the appended claims.

I claim as my invention:

1. In an electric range, the combination with a supporting member and an oven mounted thereon, of a stove top slidably mounted in said supporting member beneath said oven and having two limiting positions relatively thereto, electric heating means in said stove top, and means for permitting the energization of said heating means only when said stove top is at the limit of its path of movement in one direction in said supporting member.

2. In an electric range, the combination with a frame having an opening in one wall thereof, supporting members therefor, and an oven mounted on said frame, of a stove top located in said frame, an electric heating element in said stove top, means for permitting said stove top to be moved forwardly in said frame through said opening, and means for permitting the energization of said heating element when said stove top is moved forwardly to the limit of its path of movement.

3. In an electric range, the combination with a frame having an opening in one of its walls, supporting members for said frame, and an oven mounted on said frame, of a stove top located in said frame, an electric heating element in said stove top, means for permitting said stove top to be moved forwardly in said frame through said opening, a terminal block mounted in said frame above said opening, and means on said stove top for permitting the energization of said heating element when said stove top is moved forwardly to the limit of its path of movement.

4. In an electric range, the combination with a frame having an opening in one of its walls, supporting members for said frame, and an oven mounted on said frame, of a stove top located in said frame, an electric heating element in said top, means for permitting said stove top to be moved forwardly in said frame through said opening, a terminal block mounted in said frame above said opening, and means mounted at the rear of said stove top for limiting the forward movement thereof and for permitting the energization of said heating element when in said limiting position.

5. In an electric range, the combination with a frame having an opening of substantially rectangular outline in its front wall, supporting members for said frame and an oven mounted on said frame, of a stove top located in said frame, an electric heating element in said top, means for permitting said stove top to be moved forwardly in said frame through said opening, a terminal block mounted on the forward wall of said frame above said opening, a contact device mounted on said stove top at the rear thereof and adapted to permit the energization of said heating element when said stove top is moved forwardly to the limit of its path of movement.

6. In an electric range, the combination with a supporting member having an aperture in one of its walls, of a frame comprising a heating element slidably mounted in said supporting member and adapted to close said aperture when at the rearward limit of its path of movement therein, and means for permitting the energization of said heating element only when at the forward limit of its path of movement in said supporting member.

7. In an electric range, the combination with a supporting member of substantially rectangular box-shape having an aperture in its front wall of substantially rectangular outline and an electrically heated oven mounted on said supporting member, of a frame of substantially rectangular shape slidably mounted in said supporting member and adapted to close said aperture when at the rearward limit of its path of movement in said supporting member, a plurality of heating elements in said frame, means for permitting said frame to be moved forwardly in said supporting member through said aperture to expose said heating elements, and means for limiting the forward movement of said frame and for permitting the energization of said heating elements only when at the limit of its forward movement.

In testimony whereof, I have hereunto subscribed my name this 20th day of December, 1920.

MILTON HENOCH.